No. 820,205. PATENTED MAY 8, 1906.
W. B. KEIGHLEY.
APPARATUS FOR THE MANUFACTURE OF SHEET GLASS.
APPLICATION FILED DEC. 7, 1905.
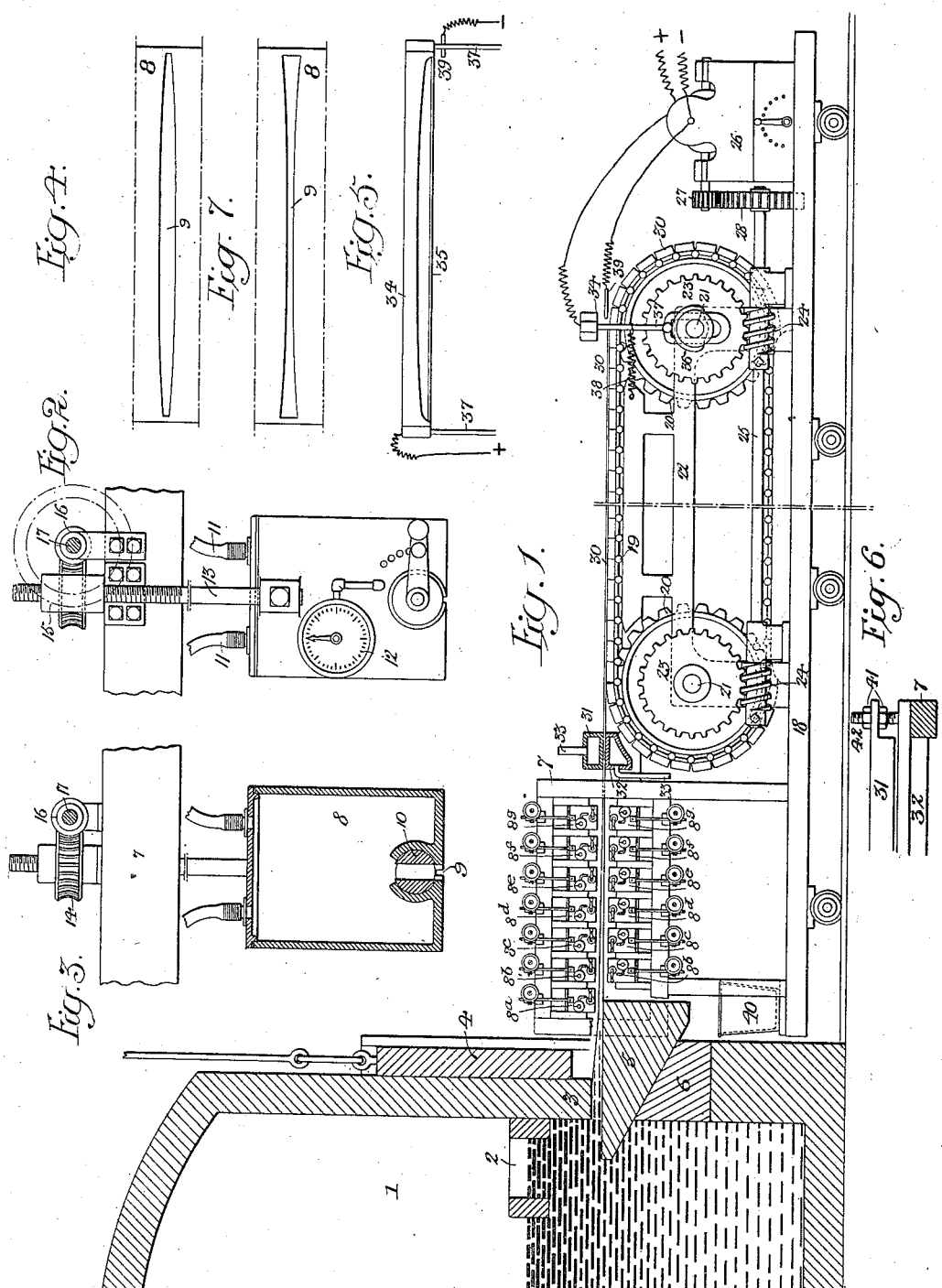
Witnesses:
Inventor: William B. Keighley
by his Attorneys

UNITED STATES PATENT OFFICE.

WILLIAM B. KEIGHLEY, OF VINELAND, NEW JERSEY.

APPARATUS FOR THE MANUFACTURE OF SHEET-GLASS.

No. 820,205.  Specification of Letters Patent.  Patented May 8, 1906.

Application filed December 7, 1905. Serial No. 290,819.

*To all whom it may concern:*

Be it known that I, WILLIAM B. KEIGHLEY, a citizen of the United States, residing in Vineland, New Jersey, have invented certain Improvements in Apparatus for the Manufacture of Sheet-Glass, of which the following is a specification.

The object of my invention is to provide a machine whereby with a minimum of labor and expense smooth, polished, and annealed sheets of glass of any desired thickness may be produced.

This object I attain in the manner hereinafter set forth, reference being had to the accompanying drawings, in which—

Figure 1 is a view, partly in side elevation and partly in section, of a sheet-glass-making machine constructed in accordance with my invention. Fig. 2 is a side view of what I term a "distributer," a series of which are employed in connection with said machine. Fig. 3 is a view, partly in side elevation and partly in section, of said distributer. Fig. 4 is an inverted plan view of part of the same.
Figs. 5 and 6 are transverse elevations of elements of the machine; and Fig. 7 is a view similar to Fig. 4, but illustrating a different form of distributer.

An ordinary glass-melting tank is shown at 1 in the drawings, this tank having adjacent to the outlet a float 2 in the form of a perforated block or ring, the function of this float being to strain off or hold back scum, stone, unmelted batch, or other foreign unmelted matter that is not intended to pass off with the glass through the outlet 3, or if the level of glass in the tank falls to the level of the outlet the float acts as a check to prevent further flow. Ordinarily, however, the discharge of glass from the outlet 3 is governed by a sliding valve or gate 4, of stone, clay, iron, or other suitable material, which is vertically guided on the face of the furnace, so that it can be raised above the outlet 3 or dropped so as to close the same.

The bottom of the outlet is formed by a wedge-block 5 of any suitable material, the under face of which rests upon the upper face of a wedge-block 6, secured to or forming part of the front wall of the furnace, said wedge-block 5 being adjustable on the block 6 by any suitable means, so that its upper face may be caused to bear any desired relation to the top of the outlet 3, and thus determine the thickness of the stream of glass flowing through said outlet onto the upper face of the wedge-block 5 beyond the same.

In front of the furnace is a framework 7, carrying two series of what I term "distributers," one series being located above the level of the top of the block 5 and the other series being located below said level, whereby said distributers will be disposed above and below the stream of glass flowing from the furnace. Each of these distributers consists of a closed vessel 8, having in its lower portion an outlet 9, governed by a valve 10, the vessel being provided with one or more pipes 11 for supplying the same with air, gas, oil, steam, water, or other fluid under pressure or with a mixture of any two or more of the same, the pressure within the distributer being indicated by a suitable gage 12 on the outside of the same. Each distributer is carried by a pair of threaded rods 13, located one at each end of the distributer, these rods being adapted to threaded openings in the hubs of worm-wheels 14, which are vertically confined in brackets 15 on the frame 7 and are engaged by worms 16 on a transverse shaft 17, mounted in bearings on said frame, each of these shafts being provided with a suitable operating wheel or handle whereby it can be turned so as to raise or lower a distributer.

The opening 9 in the lower portion of each distributer 8 is by preference of greater width at one part than at another, so as to supply fluid in greater volume at one part than at another or to supply it at one part to the exclusion of another part or parts. Thus, as shown in Fig. 4, the opening 9 is wider at the center than at the ends. Hence as the valve 10 is turned the supply of fluid will begin to flow from the central part of the opening and gradually extend to the ends of the same, and when the valve is fully open the supply will be greatest at the center and least at the ends, this diminution of supply at the ends being compensated for by the spread of the fluid from the center toward the ends of the distributer, or if there is much waste of fluid at and near the ends of the distributer the opening 9 may be the reverse of that shown in Fig. 4—that is to say, wider at the ends than at the center, as shown in Fig. 7—or if the distributer-opening is of uniform width throughout the same result may be attained by graduating the width of the passage in the valve.

The frame 7 and its distributers are mounted upon a wheeled carriage 18, which runs upon a suitable track upon the flow in front of the furnace, this carriage also being provided with an endless conveyer belt or apron, the latter in the present instance consisting of an endless chain 19, engaging sprocket-wheels 20, which are carried by a shaft 21 at opposite ends of a frame 22 on the carriage 18, said shaft also having spur-wheels 23, which are engaged by worms 24 on a longitudinal shaft 25, adapted to bearings on the carriage, said shaft being driven by any suitable means, those shown in the present instance being an electric motor 26, whose armature-shaft has a pinion 27 meshing with a spur-wheel 28 on the shaft 25.

The supporting or carrying surface of the endless conveyer-apron consists of blocks 30, preferably of wood, mounted upon the links of the chain 19 and providing a flat table or platform for the reception of the sheet of glass after the latter has passed between the upper and lower sets of distributers 8 and between a pair of tension-blocks 31 and 32, disposed one above and one below the sheet of glass, as shown in Fig. 1, these blocks being preferably composed of wood and being hollow and provided with pipes 33, so they can be supplied with water, steam, or other fluid. Any desired means for adjusting the blocks 31 and 32 in respect to each other to vary the tension upon the glass may be adopted. In Fig. 6 I have shown a lug at the end of the upper block 31, confined between nuts 41 on a screw-stem 42, which projects vertically from the support for the lower block 32. The upper surfaces of the wooden blocks 30 of the conveyer soon become carbonized by the heat of the glass, and these coatings of carbon provide a smooth support, which serves to polish the under side of the sheet of glass. The wooden tension-blocks 31 and 32 will be permeated by the water or steam, and the heat of the glass will convert the same into a thin film of gas or vapor interposed between the surfaces of the blocks and those of the sheet of glass, thus providing for the smoothing or polishing of the said sheet of glass without direct contact of the tension-blocks therewith.

Located above the conveyer-apron at the point where it begins to turn around the outermost sprocket-wheel 20 is a vertically-reciprocating frame 34, carrying a transverse wire 35, of platinum or other refractory metal, which is at intervals rendered incandescent and is lowered into contact with the sheet of glass carried by the conveyer-apron 30, so as to sever the same, the transverse line along which the heat is thus supplied constituting a line of cleavage when the sheet of glass is bent or otherwise subjected to strain.

Vertical movement is imparted to the block 34 by means of a cam 36 at each end of one of the shafts 21, each cam 36 acting upon an antifriction-roller on a rod 37, which is secured to one end of the bar 34, and is yoked for the passage of the shaft 21, the rod 37 being normally retained in the upright position (shown in Fig. 1) by the pull of a spring 38.

The block 34 is supplied with current from any available source of supply, that shown in the present instance being a shunt of the circuit which contains the motor 26, one of the terminals 39 of said shunt being so disposed that the block 34 contacts therewith on its descent, so as to complete the circuit through the wire 35 and render the same incandescent before it strikes the sheet of glass upon the conveyer 30, the circuit being broken and the current through the wire 35 being cut off as the block 34 rises. When the wire 35 is in contact with the glass, it travels forward with the same, stretching the spring 38; but as soon as the wire is lifted clear of the glass the retraction of the spring restores said wire to its normal position, the tension of the spring being at that time exhausted and the wire consequently retaining such normal position.

In starting the operation the gate 4 is closed, the wedge-block 5 is adjusted so as to provide an outlet of proper size for the outflow of the molten glass, and the carriage 18 is moved up to the front of the furnace, the distributers 8 being separated from each other to such an extent as to provide for the free passage of the sheet of glass between them. The endless conveyer belt or apron having been put in operation, the gate 4 is lifted when the batch of glass in the furnace has been brought to a proper state of fluidity, and a sheet of glass is thereby permitted to flow out upon the wedge-block or apron 5. As the blocks of which the furnace is constructed, including the wedge-block 5, are at a lower temperature than the glass, a chilling of the latter results, and in order to correct this and to raise the glass to the proper working temperature the first distributer $8^a$ of the upper series is charged with oil or gas, which is forced out under pressure through the opening 9 and being ignited is brought into contact with the sheet of glass upon the wedge-block or apron 5 in order to raise the temperature of said sheet of glass to the proper degree and maintain it thereat. The surplus glass at first flows over the edge of the wedge-block 5 and into a receptacle 40 upon the carriage 18 until a suitable bait is introduced into the fluid glass, said bait picking up the molten glass, so that upon being withdrawn it causes the glass to follow it in the form of a sheet which is drawn out between the upper and lower series of distributers 8, the bait-tongs being connected to the conveyer-apron fluid, then a cooling fluid, then a further heating fluid, and then a further cooling fluid.

11. A sheet-glass machine having a tank, means for drawing a sheet of glass from said tank, a pair of wooden tension-blocks between which said sheet of glass is caused to pass by said draft appliances and means for supplying watery vapor to the surfaces of said blocks.

12. A sheet-glass machine having a tank, means for drawing a sheet of glass from the tank, and a pair of hollow wooden tension-blocks between which the sheet of glass is caused to pass by said draft appliance, said blocks being provided with means for supplying watery vapor to the surfaces of the same.

13. A sheet-glass machine having a tank, means for drawing a sheet of glass from the tank, a pair of tension-blocks between which the sheet of glass is drawn by said draft appliance, and means located near the outlet of the tank for projecting streams of ignited gas upon said sheet of glass before it reaches said tension-blocks.

14. A sheet-glass machine having a tank, means for drawing a sheet of glass from the tank, a pair of tension-blocks between which the sheet of glass is drawn by said draft appliance, and means located near the outlet of the tank for projecting streams of cooling fluid upon the sheet of glass before it reaches said tension-blocks.

15. A sheet-glass machine having a tank, means for drawing a sheet of glass from the tank, a pair of tension-blocks between which the sheet of glass is drawn by said draft appliance, and means for heating and cooling said sheet of glass before it reaches said tension-blocks.

16. A sheet-glass machine having a tank, means for drawing a sheet of glass therefrom, and an electrically-heated severing device operating in conjunction with said draft mechanism.

17. A sheet-glass machine having a tank, means for drawing a sheet of glass therefrom and supporting the same during its travel, and an electrically-heated severing device movable from and toward said conveyer to contact with the sheet of glass at successive points in the length of the same.

18. A sheet-glass machine having a tank, means for drawing a sheet of glass therefrom and supporting the same during its travel, an electrically-heated severing device for said sheet of glass, and means for opening and closing the electric circuit through said severing device at intervals.

19. A sheet-glass machine having a tank, means for drawing a sheet of glass therefrom and supporting it during its travel, an electrically-heated severing device movable from and toward said supporting-conveyer to contact with the sheet of glass at different points in its length, and means whereby movement of said severing device is caused to open and close the electric circuit through the electrical member of the same.

20. A sheet-glass machine having a tank, means for drawing a sheet of glass therefrom, and an electrically-heated severing device movable from and toward said sheet of glass and also movable forwardly with the same.

21. A sheet-glass machine having a tank, means for drawing a sheet of glass therefrom, and an electrically-heated severing device movable from and toward said sheet of glass and also movable forwardly with the same, and a spring for returning said device to its normal position.

22. A sheet-glass machine having a tank, a mechanical device for supporting and carrying forward a sheet of glass issuing from the tank, and means located near the outlet of the tank for projecting a heating fluid against said sheet of glass before it comes into contact with said mechanical conveying device.

23. A sheet-glass machine having a tank and a mechanical device for supporting and carrying forward a sheet of glass issuing from said tank, with means for projecting heating and cooling fluids alternately against said sheet of glass before it comes into contact with the said mechanical conveying device.

24. A sheet-glass machine having a tank, means for feeding forwardly a sheet of glass issuing horizontally from said tank, and means for projecting fluid under pressure onto the under side of said sheet of glass to buoy up or support the same before it reaches said mechanical conveyer.

25. A sheet-glass machine having a tank, means for conveying forwardly in a horizontal direction a sheet of glass issuing from said tank, means for projecting fluid under pressure onto the under side of the sheet of glass issuing from the tank to buoy up or support the same before it reaches said mechanical conveyer, and a pair of tension-blocks interposed between said mechanical conveyer and said fluid-supporting means.

26. A sheet-glass machine having a tank, and means located near the outlet of the tank for projecting upon the sheet of glass issuing from the tank, a spray of fluid extending across said sheet of glass and of uniform temperature and pressure throughout.

27. A sheet-glass machine having a tank, and means located near the outlet of the tank for projecting upon the sheet of glass issuing from said tank, a spray of fluid extending across said sheet and of uniform temperature throughout, which temperature is lower than that of the said sheet of glass.

28. A sheet-glass machine having a tank, and means located near the outlet of the tank for projecting upon each side of the sheet of 30, which has a relatively slow but regular advance movement imparted to it. The upper and lower distributers $8^b$ and $8^c$ project streams of air onto the sheet of glass so as to chill the same, the air from the distributers $8^c$ being preferably of a higher pressure and a lower temperature than that from the distributers $8^b$. The distributers $8^d$ and $8^e$ project streams of ignited gas or oil, either alone or mixed with air or steam, or both, onto the sheet of glass for the purpose of effecting the smoothing out of wrinkles, waves, blisters, or previously-produced gas-marks, as well as permitting a drawing or stretching of the sheet of glass under the action of the conveyer belt or apron 30. The distributers $8^f$ project onto the sheet of glass streams or sprays of heated acid to further smooth and polish the same, and the distributers $8^g$ project onto the glass streams of hot air or hot water to anneal the same before it passes through the tension-blocks 31 and 32 and onto the conveyer 30, which may, if desired, have a higher surface speed than the sheet of glass, so that the frictional action of the wooden blocks of the conveyer upon the glass has a tendency to further smooth and polish the same, as well as to exert a drawing action upon the sheet to pull it between the distributers and tension-blocks. The streams of air, gas, or other fluid issuing beneath the forwardly-moving sheet of glass serve to buoy up or support the same and render it unnecessary to bring the sheet of glass into contact with any metallic or other support which would tend to mar the surface of the sheet or interfere with the proper formation of the same. The continuous sheet of glass is cut into strips of suitable length by the action of the electrically-heated cutting-off wire 35, the severed sheets being carried by a supplementary conveyer or other suitable means to the leer or annealing-oven, to which they are transferred for further annealing, if that is found to be necessary. It is essential that the distributers shall eject their several fluids under predetermined pressures and temperatures and that the speed of the conveyer and the tension of the blocks 31 and 32 shall be properly adjusted, these being matters within the skill and judgment of the attendant.

At the beginning of the operation the glass is likely to be thick, wavy, and imperfect; but when the distributers and tension-blocks eventually perform their intended functions a continuous sheet of glass of uniform thickness and finish will be produced, provided, of course, that the consistency of the glass, the pressure and temperature of the fluid elements, the speed of the conveyer, and the tension imparted by the blocks 31 and 32 remain constant.

As the action of the machine is substantially automatic after it is once started, it will be evident that it can be operated with a minimum of labor. Hence economical production of the finished product is insured.

Of course it will be understood that many variations in the details of the mechanism can be made without departing from the essential features of my invention. I therefore do not wish to limit myself to the specific details shown in the drawings, but

I claim—

1. A glass-making furnace or tank having an adjustable block for varying the area of the discharge-outlet from said tank, said block having a wedge bearing on the tank, whereby it will be raised and lowered by movement in a direction at right angles to the vertical.

2. A sheet-glass machine having a tank and means located near the outlet of the tank for projecting upon the sheet of glass emerging from the tank a stream of ignited gas or vapor in a direction transverse to the direction of flow of the sheet.

3. A sheet-glass machine having a tank and means for projecting repeated streams of ignited gas or vapor upon the sheet of glass issuing from the tank, said streams being separated from one another in order to permit of a cooling of the sheet of glass between the successive heatings.

4. A sheet-glass machine having a tank and means located near the outlet of the tank for projecting streams of ignited gas or vapor and of air or other fluid successively upon the sheet of glass issuing from the tank.

5. A sheet-glass machine having a tank and means for projecting repeated streams of ignited gas or vapor, alternating with streams of air or other fluid, upon the sheet of glass issuing from the tank.

6. A sheet-glass machine having a tank and means for providing fluid under pressure to the under side of the sheet of glass issuing from the tank, to buoy up or support the same in its passage.

7. A sheet-glass machine provided with a tank and means located near the outlet of the tank for projecting streams of ignited gas or vapor upon opposite sides of a sheet of glass issuing from the tank.

8. A sheet-glass machine having a tank and means located near the outlet of the tank for projecting, first a heating fluid and then a cooling fluid, upon a sheet of glass issuing from the tank.

9. A sheet-glass machine having a tank and means located near the outlet of the tank for projecting, first a heating fluid and then a cooling fluid, upon opposite sides of a sheet of glass issuing from the tank.

10. A sheet-glass machine having a tank, and means for projecting upon a sheet of glass issuing from the tank, first, a heating glass issuing from said tank, a spray of fluid extending across said sheet, and of uniform temperature and pressure throughout.

29. A sheet-glass machine having a tank, and means located near the outlet of the tank for spraying upon each side of the sheet of glass issuing from said tank, a spray of fluid extending throughout the width of the sheet and of equal temperature throughout, which temperature is less than that of the sheet of glass.

In testimony whereof I have signed my name to this specification in the presence of two subscribing witnesses.

WILLIAM B. KEIGHLEY.

Witnesses:
WALTER CHISM,
JOS. H. KLEIN.